Oct. 3, 1939.   A. LESTI   2,174,634
RADIO STATION CENTER TUNING PUSH-BUTTON CONTROL
Filed Jan. 12, 1938   6 Sheets-Sheet 1
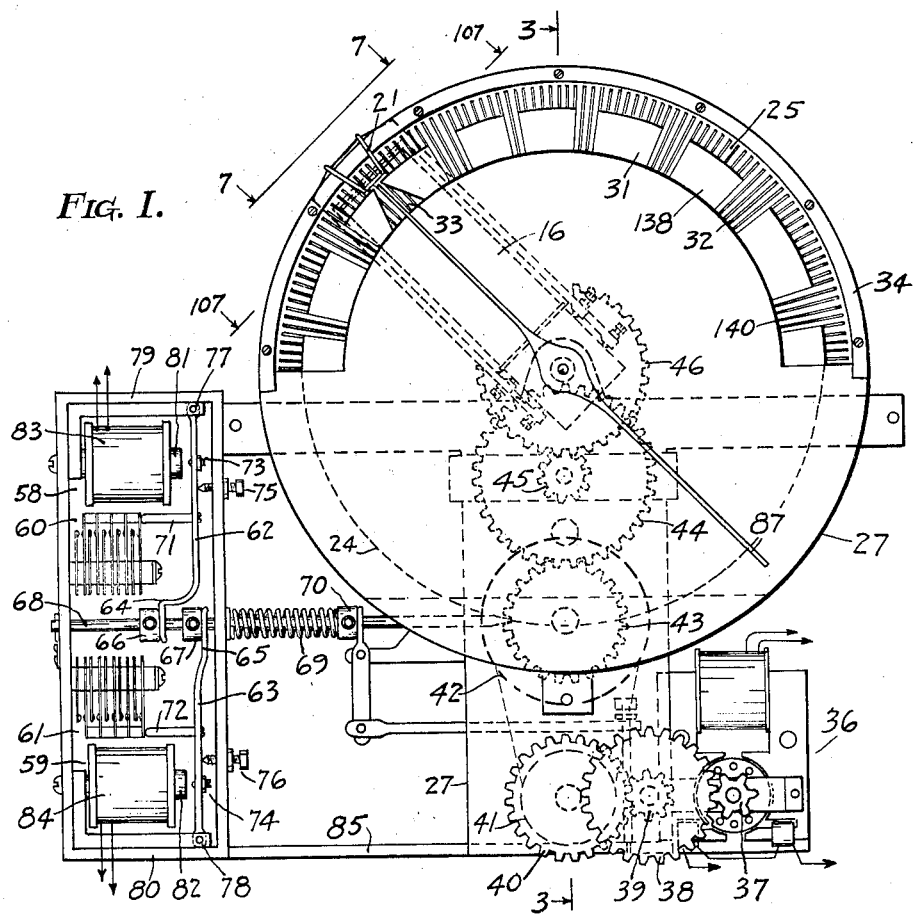
FIG. I.
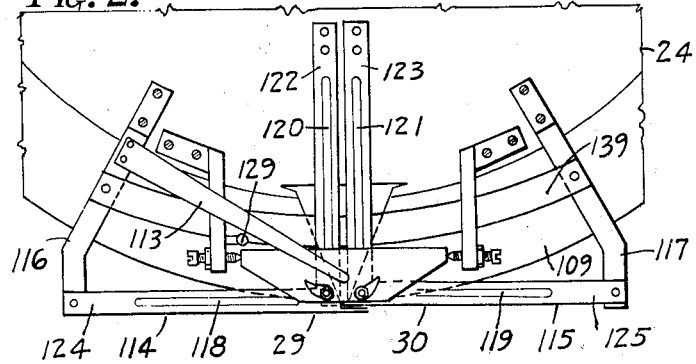
FIG. 2.
INVENTOR
Arnold Lesti Oct. 3, 1939.  A. LESTI  2,174,634
RADIO STATION CENTER TUNING PUSH-BUTTON CONTROL
Filed Jan. 12, 1938  6 Sheets-Sheet 2
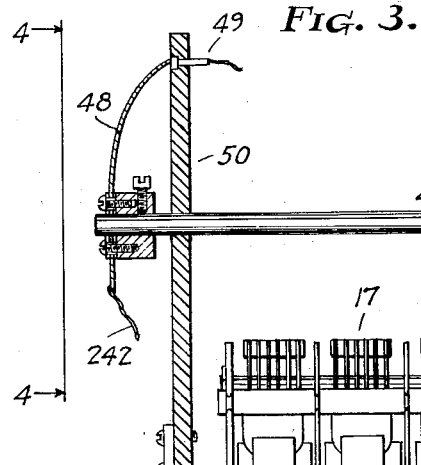
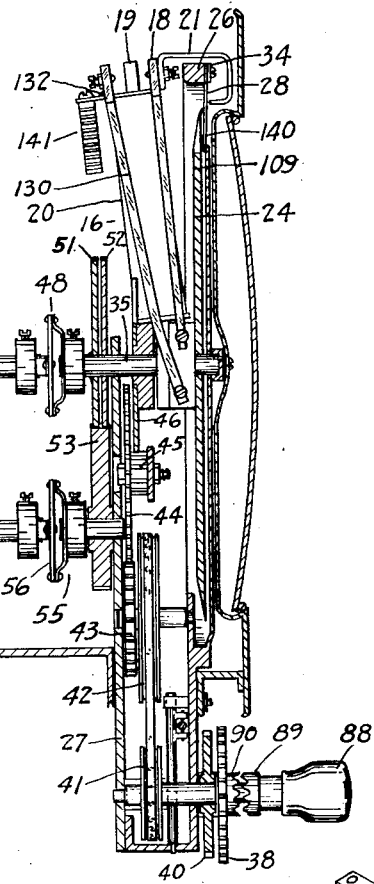
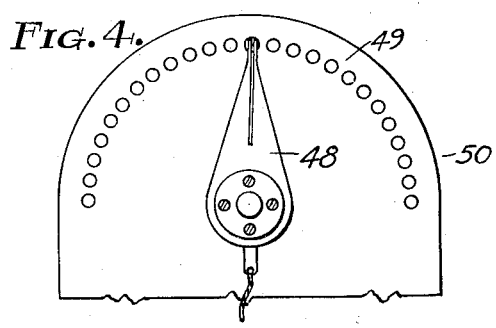
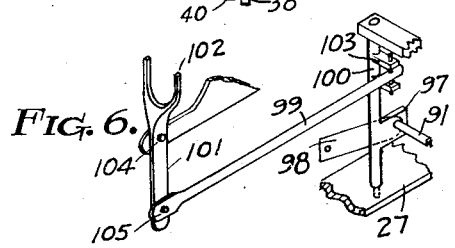
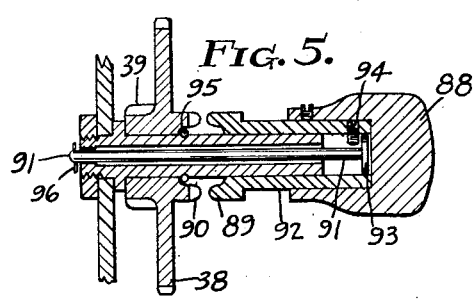
INVENTOR
Arnold Lesti

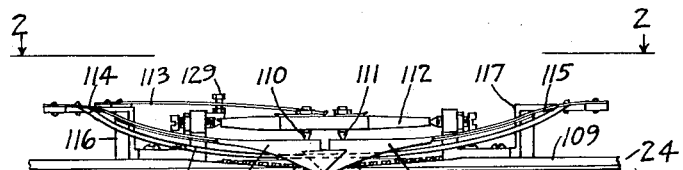
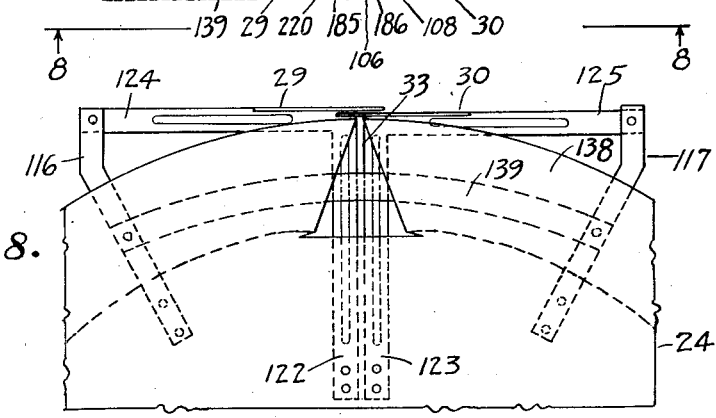
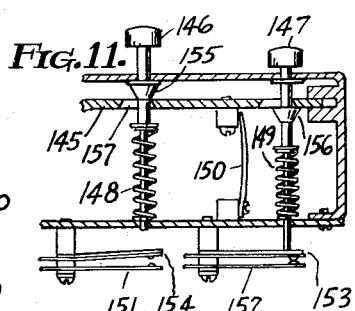
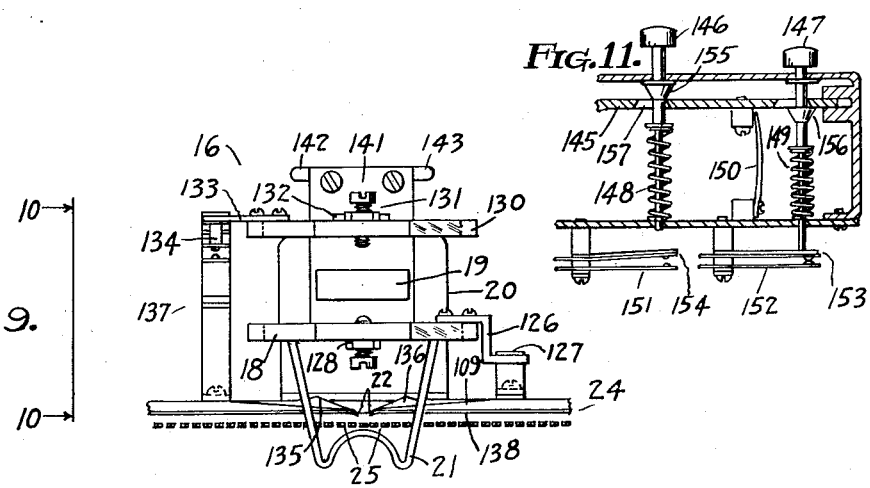
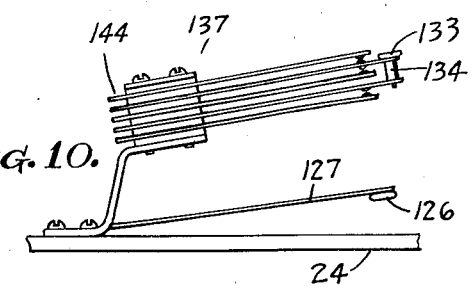

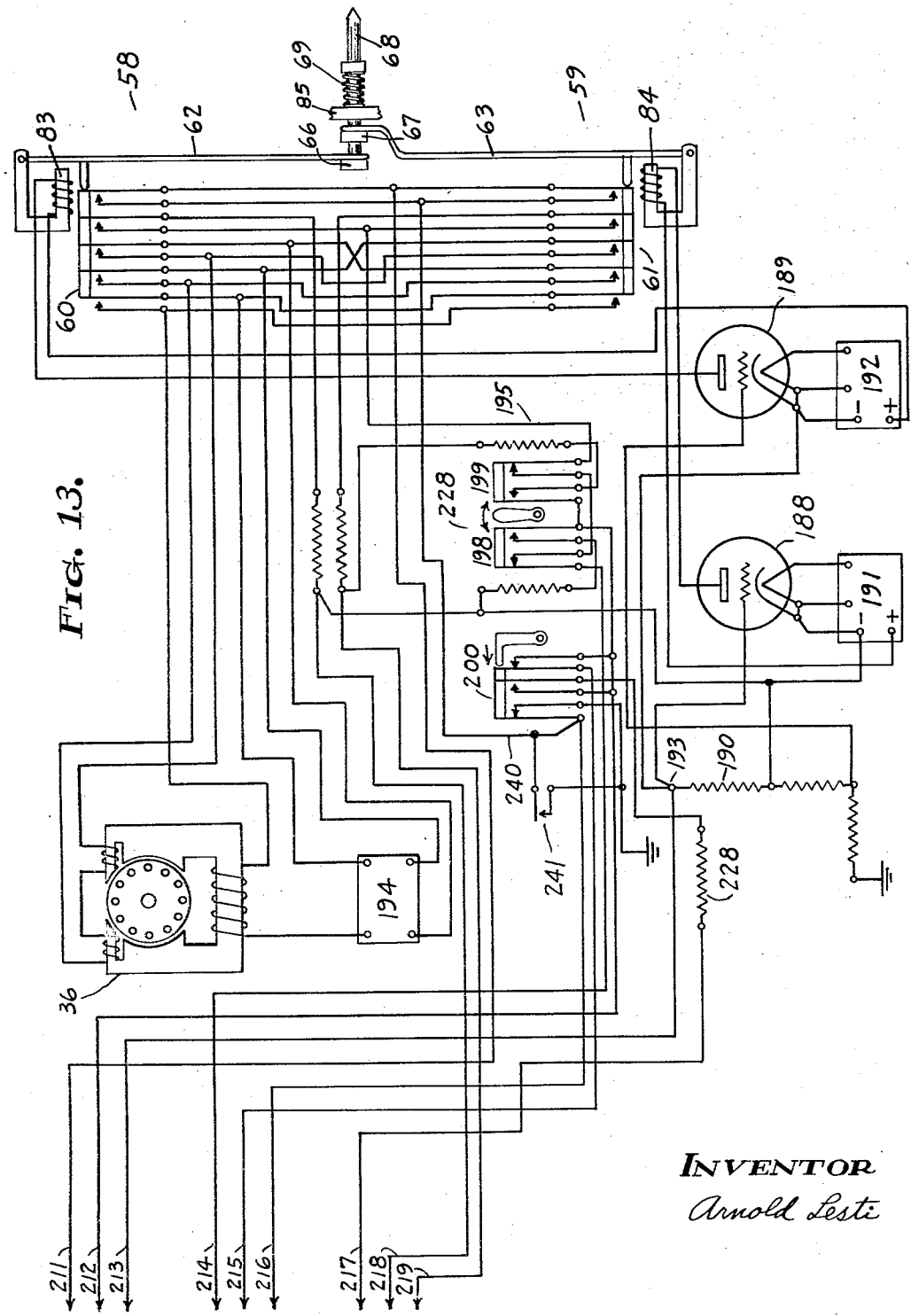

Oct. 3, 1939.　　　　　　A. LESTI　　　　　　2,174,634
RADIO STATION CENTER TUNING PUSH-BUTTON CONTROL
Filed Jan. 12, 1938　　　6 Sheets-Sheet 6
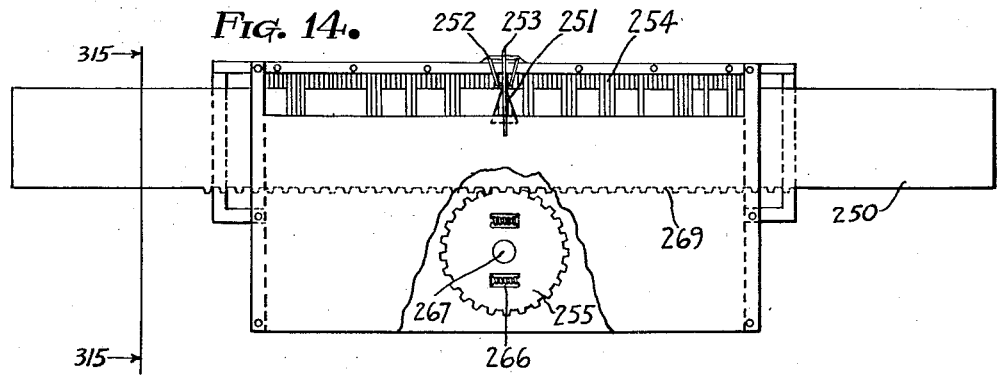
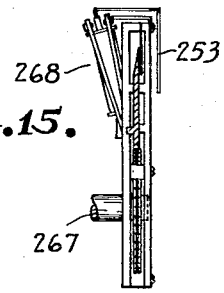
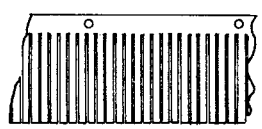
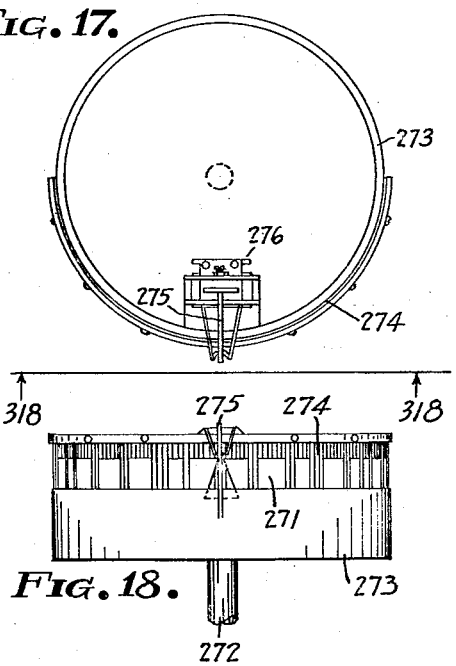
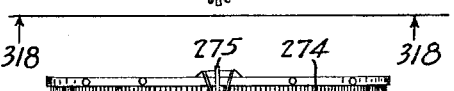
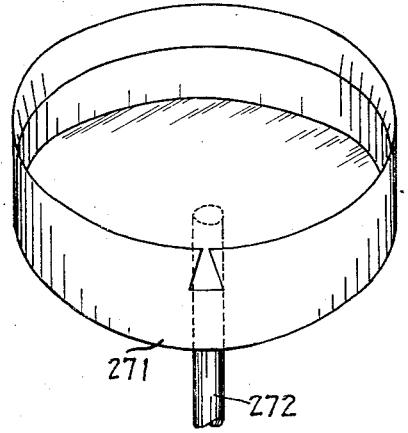
INVENTOR
Arnold Lesti Patented Oct. 3, 1939

2,174,634

UNITED STATES PATENT OFFICE 2,174,634

RADIO STATION CENTER TUNING PUSH-BUTTON CONTROL

Arnold Lesti, Los Angeles, Calif.

Application January 12, 1938, Serial No. 184,576

10 Claims. (Cl. 250—40)

My invention is in a push-button tuning control to accurately tune radio receivers to transmitting stations by pushing or pressing corresponding buttons. The present invention is also an improvement and extension of the disclosure in my previous application, Serial Number 137,509, filed April 17, 1937, for Radio station center tuning control.

An object of the present invention is to provide a radio push-button system wherein previous adjustments or settings are eliminated or greatly minimized and where the conventional operation, for push-button action, of adjusting to the resonance peak of a desired station is entirely eliminated. In this connection a feature of this invention is to permit the tuning mechanism to follow the station and tune itself in accordance with the exact position of the station transmitting whereby the station itself controls the exact stopping position.

Another object of my invention is to provide a push-button system that is self adjusting and self correcting when the radio receiver to which it is applied drifts or changes its tuning position. It is well known that such alterations occur due to changes of supply voltage and variations in temperature, humidity or aging of circuit components. In this connection an important object of my invention is to provide such self adjustments and such self corrections without modifying the alignment of the tuned circuits in the radio receiver thereby insuring perfect tuning by push-button control at all times. A detailed feature of the present invention is to provide motor actuation of the tuning system of the radio receiver to which it is applied whereby the tuning system is moved in a novel manner by the shortest route or path to the desired station.

Another object of my invention is a provide a push-button control of the above type to operate as an adjunct of a radio station indicator of the general type described in my previous application above referred to.

In my previous invention I found that a series of shutters may be operated separately and independently and that the operated shutters may be held after the operative influence has passed to give a simultaneous visible indication of all the radio transmitting stations within the receptive range of the radio receiver. In my present invention improved forms of center tuning, to accurately obtain the center between the sides of the shutter indication, are utilized for push-button control of a novel type. I have found that motor scanning of the shutters may be utilized to give a shutter indication of the transmitting stations and the centering of such shutter indications permits the accurate positioning of the tuning element and to allow the positioning to follow the center of the shutter indication to give accuracy independent of the receiver circuit drift mentioned above. I have found that a series of push-buttons may be used, each to control separate specified regions of the tuning range and that accurate positioning of the tuning element by a motor drive may be effected by the above mentioned center of the shutter indication, which may be situated in any region under control of a particular push-button.

Another object of my invention is to provide a push-button control of the above type for radio receivers having several tuning ranges or bands and to allow such push-button tuning control of transmitting stations in any tuning band using the same series of buttons.

A further detailed feature of the present invention is to permit accurate tuning of long distance and local stations under the control of a flip or momentary closure of a switch or push-button allowing the tuning mechanism to suddenly leave a given station and hunt accurately a neighboring station. Another feature is to enable the above flip tuning to render unnecessary any manual operation of tuning knobs either for local, distance or short wave stations.

Another feature of this invention is to provide a stable, simple and inexpensive push-button mechanism to perform the above objects.

With the foregoing and other objects and features in view which will be made manifest in the following detailed description and pointed out in the claims, reference is had to the accompanying drawings for an illustrative embodiment of the invention wherein:

Fig. 1 is a front view of the indicator with escutcheon and attachment removed and showing also the control relays and motor drive system.

Fig. 2 is a view along line 2—2 of Fig. 7.

Fig. 3 is a sectional view on the line 3—3 of Fig. 1 showing also the escutcheon and attachments in section and the manner of coupling the variable condenser of the radio receiver and commutator.

Fig. 4 is a view along line 4—4 of Fig. 3.

Fig. 5 is a sectional view of the manual control knob.

Fig. 6 is an isometric view of the manual brake release linkages.

Fig. 7 is an enlarged view on the line 7—7 of

Figure 12:
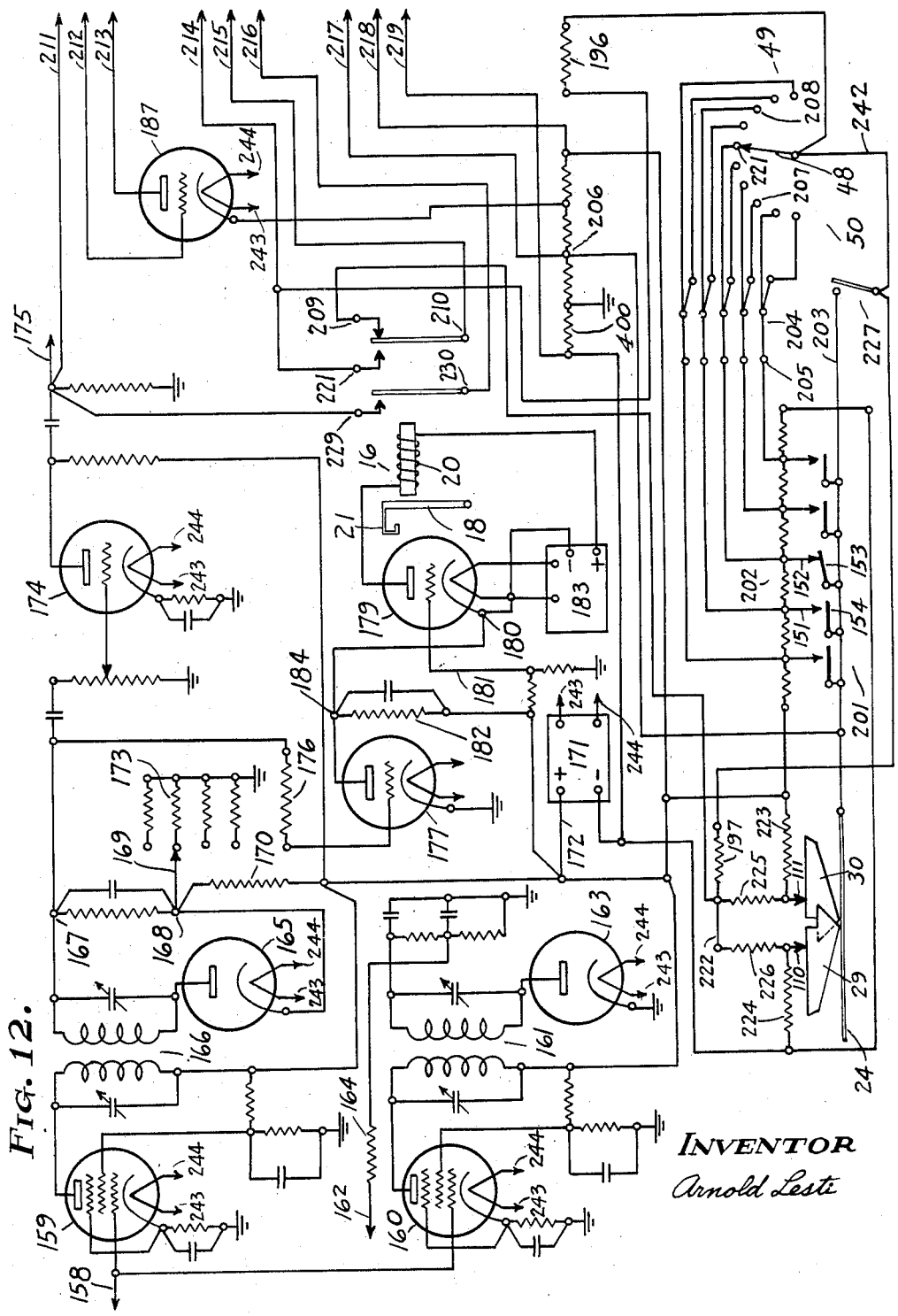

Fig. 1 illustrating only the centering feeler assembly.

Fig. 8 is a view in the line 8—8 of Fig. 7 showing part view of the movable slotted disc with feelers thereon.

Fig. 9 is a view of the line 7—7 of Fig. 1 similar to Fig. 7 but illustrating the double armature relay without the feeler assembly.

Fig. 10 is a view on the line 10—10 of Fig. 9 showing only the spring contact assembly and spring.

Fig. 11 is a part sectional view of a push-button and contact mechanism.

Fig. 12 is a diagrammatic view of the circuit connections also illustrating a method of applying the invention to a radio receiver.

Fig. 13 is an extension of Fig. 12.

Fig. 14 illustrates one form of the invention.

Fig. 15 is a view on the line 315—315 of Fig. 14.

Fig. 16 shows the shutter construction for the form of the invention as depicted in Fig. 14.

Fig. 17 illustrates another form of the invention.

Fig. 18 is a view on the line 318—318 of Fig. 17.

Fig. 19 is an isometric view of the slotted movable member required in the cylindrical form of the invention as illustrated in both Fig. 17 and Fig. 18.

Referring to the accompanying drawings wherein similar parts are represented by similar numbers throughout, 16 represents generally the movable relay which is rotatable with the variable condenser 17, in Fig. 3, of the radio receiver. The relay armature 18 is attracted magnetically to the core 19 when the relay coil 20 is energized as explained below. Finger 21 will then move several shutters 25 towards the protuberances 22, shown in Fig. 9, to spring these shutters slightly inward. Only one shutter such as 28 will travel through the slot 33 towards the back face 109 of disc 24. Rotation of the relay 16 with disc 24, to which it is rigidly fixed, causes finger 21 to engage other shutters if the relay is energized. The shutters designated generally by 25 are held to the ring 26 integral with frame 27 by screws and washers 34. The feelers 29, 30 bear against the shutters in the opposite direction to finger 21. These feelers are positioned opposite the finger to permit their movement together with the shutters. Superimposing of Fig. 7 and Fig. 9 illustrates this feature together with the protuberances 22 which makes possible the elimination of the feeler lift mechanism disclosed in my prior application. As a result of discontinuous operation of relay 16 and a rotation, the shutters will be scanned to give an appearance represented by 31 in Fig. 1. The indication 32 may represent a radio station transmitting during the scanning period.

Disc 24 and relay 16 are held to shaft 35 by set screws not shown. I prefer a shaded pole type induction motor 36 to drive the gear train and entire assembly. Motor pinion 37 engages gear 38 which is integral with pinion 39. This drives gear 40 with pulley 41 belted to pulley 42 to turn gear 43 which, in turn, is coupled to rotate gear 44 with pinion 45. Pinion 45 finally drives gear 46 which has a hub held to the shaft 35 by a set screw not shown. This arrangement is substantially similar to my prior disclosure except for the insertion of the motor drive and other important differences explained below.

When the movable relay assembly is rotated the motor is coupled to shaft 47 Fig. 3 by universal joint 48. Then rotation is given to wiper 48 which engages commutator segments generally represented by 49 on the commutator 50.

Elliptical gear 51 is fixed to shaft 35 and rotatable. Elliptical mate gear 52 is coupled with springs to 51. Both gears 51 and 52 are coupled to elliptical gear 53 to eliminate back lash and provide substantially an evenly calibrated dial and avoid the crowding of stations on the low wave length side of the dial as shown in detail in my prior application. Gear 53 is coupled to variable condenser 17, fixed on the chassis 54 of the receiver, by coupling 55 with insulating washer 56.

Relays 58, 59 with spring assemblies 60, 61 have armatures 62, 63 with forked ends 64, 65, engaging bushings 66, 67 on brake rod 68 which engages the teeth of gear 43 when normal or restored by the spring 69 bearing against bushing 70 held to brake rod. When relays 58, 59 are energized separately, as explained in detail below, their spring assemblies operate from the movement of rods 71, 72, held to the armatures, against the traveling springs of 60, 61. The armatures are provided with residual screws 73, 74 which, with back stop screws 75, 76, limit the movement and provide for adjustments to govern the speed of release and operate. The armatures hinge by pins 77, 78 on brackets 79, 80, which are made of magnetic material and form a part of the magnetic circuit of the relays having cores 81, 82 and coils 83, 84.

The relays are fixed by screws to the frame 85 which is integral with frame 27. I prefer to operate relay 58 to cause motor 36 to turn disc 24 and relay 16, together with pointer 87, in the right or clockwise direction, while relay 59 will cause the motor to turn these members in the left or counterclockwise direction. When either spring assembly 60, 61 is operated to close the contacts, circuit connections are established which, while not shown in Fig. 1 to avoid confusion, are detailed in Fig. 13 and Fig. 12 and explained below, cause the operation of motor 36 and other circuit requirement also explained below.

Brake rod 68 locks gear 43 when normal, as shown in Fig. 1, prevents the motor drive from turning the entire rotatable assembly and permits quick stopping ability. When armatures 62 and 63 are pulled towards the cores 81 and 82 forks 64 and 65 push bushings 66 and 67 and brake 68 against the spring 69 releasing the braking action on gear 43. The forks 64 and 65 are similar to fork 102 also shown in isometric form in Fig. 6. Relays 58 and 59 never operate at the same time and fork 64 disengages the brake independently of fork 65 and vice versa. When either relay is operated the motor drive is in motion and at the instant of release the brake plunges in the gear teeth stopping the same and the motor operating circuit is opened. In some cases the brake may be dispensed with.

In the drawings gears 43 and 44 are shown with coarse teeth for clearness. It is obvious that the spacing of the teeth on gear 43 will determine the points at which brake rod 68 may conveniently plunge to stop the tuning mechanism. The teeth on the gear 43 may be constructed as close together as is necessary to obtain the desired accuracy, while the turning ratio between shaft 35 and gear 43 may be also suitably chosen depending upon the kilocycle range for one full sweep of the tuning mechanism. Other suitable standard driving arrangements may be used.

Manual knob 88, in Fig. 3 and Fig. 5 is, provided for manual control if desired. The brake system must then be released and I prefer to establish such release by pushing the knob inwards before turning and holding the same inward during the act of turning. When the knob 88 is pushed inward clutch members 89 and 90 engage, linking the knob to gear 38 and the entire motor drive system. Sleeve 92 together with rod 91 having flange 93 are also moved inwards towards the frame. Split snap ring 95 prevents gear 38 from moving forward. Set screw 94 prevents knob 88 and sleeve 92 from being moved back excessively by stopping against flange 93 on rod 91 which is held from moving back by key 96. When rod 91 moves inwardly it pushes arm 97, Fig. 6, on shaft 100 against the restoring spring 98 riveted to the frame 27. A rotation of 100 will cause movement of rod 99 through linkage 103 to the right. Linkage 105 will transmit this motion from 101 to fork 102 through hinge 104. The fork moves to the right causing it to release the brake rod 68 in a manner similar to relay forks 64 and 65 mentioned above.

The feelers and their attachments and other details are omitted in Fig. 3 to avoid confusion. In Fig. 7 the feelers 29 and 30 with tapered edges are shown centered on the shutter indication 106. These tapered edges 185 and 186 may have a small amount of hard substance fixed thereon to minimize wear. The shutters in both Fig. 7 and Fig. 9 are illustrated in section on the line 107, 107 of Fig. 1. The feelers engage at points 229 and 108 of the shutters which are against the back face 109 of disc 24. When the disc 24 and its assembly rotates, the feelers move along with it but the shutters remain in the same radial position. The feelers will then articulate independently. When 24 moves to the left feeler 29 will rise and feeler 30 will lower. Feeler 29 will still make contact with contact tip 110 on the insulating assembly 112, which swivels on pivot screws and is given tension towards the feelers by spring 113. Feeler 30 will break contact with contact tip 111 and spring downwards towards the shutters.

When the disc 24 moves to the right the opposite condition obtains wherein feeler 29 breaks contact with 110 and springs towards the shutters. The insulating rigid member 112 is provided with pivot screws to eliminate any twisting or lost motion. The feelers are provided with braces 114 and 115 held to arms 116 and 117 to prevent twisting during articulation and provide a sharp break with the contact points 110 and 111. There are indentations or ribs 118, 119, 120, 121 along part of the length of the feeler arms to stiffen these members and permit movement only at the ends 122, 123, 124, 125. Feeler 29 moves with an axis from 122 to 124 while feeler 30 moves with a similar axis from 123, 125. Contact points 110, 111 both make with the feelers when the assembly is centered on the indication such as 106 corresponding to the resonance of a radio station received. Adjustments of points 110 and 111 by nuts on the threaded portion of these contact points permit positioning the closing of both contact points on the feelers either to the right, left or exact center of the shutter indication. The feelers are used to stop the motor drive when the center of the shutter indication is reached, corresponding to resonance of a radio station received by the radio receiver, as explained in detail below.

Referring to Fig. 9 armature 18 having extension 126 is held normally away from the core 19 by spring 127 bearing against 126. Finger 21 is welded on to the armature and moves with the same. The residual screw 128 and back stop 129, shown in Fig. 2 and Fig. 7, limit the armature's movements. The secondary armature 130, with residual screw 131 and back stop 132, moves independently towards the core 19 and is provided to operate the spring assembly of Fig. 10 at a different and generally later time than when the shutters are operated. This secondary armature may be eliminated, in some cases, with the spring assembly in Fig. 10 being then operated by armature 18. There is an extension 133 on the secondary armature to operate contacts of the spring assembly having bushing 134.

Elevated portions 135 and 136 on the back face 109 of the disc 24 with corresponding front face indentation insure full quick restoration to the front face of the free movable springing end of the shutters during rotation of the disc. The shutters are self restoring by spring action to a position adjacent the front face 138 of disc 24.

I prefer to energize the relay 16 when the radio receiver is detuned, in which case the series of shutters held adjacent the front face 138 will constitute an indication of radio stations received as the tuning element of the radio receiver is varied. In this case the position of the shutters adjacent the front face 138 may be considered their operated position and after going through the slot 33, while held on the back face 109, they may be considered as being in their normal position. However, in the alternative method of indicating the stations received, wherein blank spaces adjacent the front face 138 may correspond to stations received, the opposite nomenclature may be used, i.e., adjacent the front face 138 the shutters may be considered as being in their normal position while in the back face they may be considered as being in their operated position. Comparatively few shutters of substantial thickness are shown in the drawings for the sake of clearness. The shutters may be preferably a few thousandths of an inch in thickness and I have used 380 shutters to cover one megacycle sweep.

The shutter guide 139 prevents the free movable ends 140 of the shutters from touching the feeler arms. There are lugs shown held firmly to the contact tips 110 and 111 from which flexible insulated leads may be connected to the insulated lugs 142 of terminal block 141. Ends of coil 20 are connected to other similar lugs together with ends 144 of spring assembly 137. The other ends 143 of lugs 142 connect to flexible insulated leads which may connect to terminals held to the frame 27 or chassis 54, not shown, from which points I prefer to make circuit connections as detailed below.

While I have shown the shutters in a preferably semicircular form, this arrangement is not absolutely necessary. Where space is ample the shutters may extend substantially in a straight line. In this latter case the movable disc 24 would have a straight edge and a slot similar to 33, while a relay similar to 16 would be fixed thereon and move in a straight line.

Fig. 11 illustrates a part sectional view of a push-button mechanism of a general type. There are many push-buttons such as 146 and 147. Push-button 147 is shown depressed with a tapered section 156 held by movable member 145 which is pushed towards the left by spring 150. Contacts 152 and 153 are shown made. If push-button 146 is depressed against the tension of spring 148, tapered section 155 will move into hole 157 pushing 145 towards the right allowing 147 to rise by the action of compressed spring 149 to push this button through the hole provided on 145 and thus break the contact at 152 and 153. Push-button 146 will stay in a depressed position when movable member 145 latches the top of tapered section 155, permanently making contact 151, 154. This type of mechanism may be conveniently used with the present invention to obtain push-button control whereby a button such as either 146 or 147 may correspond to a radio station within the receptive range of the radio receiver to which this invention is applied, and when the push button is depressed the tuning mechanism will be turned by the shortest route to that station and stop accurately on the resonance point of that station.

In Fig. 12 lead 158 goes to the secondary of the intermediate frequency transformer of which the primary is connected to the amplifying tube preceding tube 159 or 160. The part of the receiving circuit which precedes these tubes is conventional and preferably of the superheterodyne type and the condenser 17, shown in Fig. 3, constitutes the variable tuning element of the receiver to which this novel invention is applied.

I prefer to apply intermediate frequency potentials from lead 158 to control the grids of tubes 159, 160. Tube 160 provides an amplified output to the diode 163 through transformer 161, which rectifies the intermediate frequency currents and establishes a negative potential on lead 162 the magnitude of which is proportional to the intensity of the carrier of the received signal. The lead 162 is fed to the conventional automatic volume control circuit of the receiver. For quick scanning it is better to maintain resistance 164 lower than the conventional and the by-pass condensers in the automatic volume control lead should preferably be lower capacity than the conventional, to permit quick charging and discharging of this circuit. A full wave rectifier system may be used instead of the half wave system shown either for the circuit connected to tube 163 or 165.

While I have shown separate amplifying tubes 159, 160, this arrangement is not absolutely necessary as other arrangements, well known to the art, may be used. The secondary of transformer 161 may be inductively coupled to the primary of transformer 166, thus eliminating tube 160 when great sensitivity is not required.

The amplified output of tube 159 is fed to diode 165 through transformer 166 to provide a negative potential, with respect to ground, at point 167, the magnitude of which is also proportional to the intensity of the carrier of the received signal. A positive potential is superimposed at 168 to add to the negative potential on 167 from the source of potential 171 from lead 172 to voltage dividing resistors 170, 173. Switch 169 is coupled to the wave band switch of the receiver allowing different resistances to be cut in, similar to 173, with a value depending upon the general noise level and sensitivity of the receiver on that band. Demodulated voltages are fed to audio amplifying tube 174 and thence to the rest of the audio frequency amplifier, not shown, from lead 175. The potential at 167 is also fed to the grid of the tube 177 through limiting resistor 176 to limit the load on the diode circuit whenever the potential swings in the positive direction. Tube 177 is directly coupled by resistance 182 to tube 179. To maintain the proper phase the coupling lead is fed to the cathode 180 and the grid is held at a fixed potential by lead 181. Coupling resistance 182 is shown with by-pass condenser to filter out the audio currents in this circuit. A source of potential 183 supplies both heater and plate current for tube 179 as shown. The grid of tube 177 is normally held at a potential to cause the plate current to have a high current flow, maintaining 184 at a comparatively low positive potential and causing lead 181 to be at a low negative potential with respect to 180, thus allowing tube 179 to pass a high plate current, energizing coil 20 of relay 16 and causing both armatures of this relay to be pulled up towards the core when no stations are being received.

If scanning takes place with no stations being received the shutters will all be pulled towards the back face of the disc 24 by the action of armature 18 and finger 21. When a radio station is received a high negative potential will be placed at point 167, which will be maintained for a considerable range on both sides of the exact point of resonance of the station. This negative potential causes the plate current of tube 177 to lower in value or cut off. The positive potential at 184 will then rise, making 181 relatively negative by comparison, thus lowering or cutting off the plate current of tube 179. This will release both armatures of relay 16 with a consequent springing back through the slot 33, of the shutters, thereby establishing an indication such as 32 in Fig. 1. During the time of scanning, either to the right or left, any radio station received will produce a similar effect at the proper corresponding part of the dial. The automatic volume control potential at 162 should be sufficiently high to properly minimize the variations in the width of the indications of all the stations received. Tube 177 may be eliminated, in some cases, with the grid of tube 179 connected directly to 167.

Referring to both Fig. 12 and Fig. 13 tube 187 is coupled with resistance 190 to both tubes 188 and 189 with the grid of tube 187 maintained normally for plate current cut-off of both 188, 189. The plate of tube 187 is connected to the grid of tube 188 and the cathode of tube 189, while the cathode of 188 is maintained at a potential with respect to its grid for normal plate current cut-off and the grid of 189 is maintained at a potential, with respect to its cathode, for normal plate current cut off of this tube. These tubes are furnished with sources of heater and plate current 191, 192. The plate circuit of tube 188 includes coil 84 while that of 189 includes coil 83 allowing these tubes to control relays 58 and 59. Whenever the potential on the grid of tube 187 changes in the positive direction there will be a lowering of potential at 193. This will cause the grid of tube 189 to become more positive with respect to the cathode, allow plate current to flow, energize coil 83, operate relay 58 and cause the motor drive to scan in the right direction. When this takes place tube 188 is maintained at plate current cut-off.

When the potential on the grid of tube 187 changes in the negative direction there will be a raising of the potential at 193. This will cause the grid of tube 188 to become relatively more positive with respect to the cathode, allow plate current to flow in tube 188, energize coil 84, operate relay 59 and cause the motor drive to scan in the left direction.

I prefer a source of alternating current 194 for induction motor 36 with a lower voltage for the shaded poles as shown. It is to be understood, however, that other suitable direct or alternating current motors may be used in a known and standard manner. Reversal of the motor takes place by reversing the leads to the shaded pole coils as shown.

A locking lead 195 is provided to receive a positive locking potential if relay 58 is operated and a negative locking potential if relay 59 is operated. This lead connects indirectly to the grid of tube 187 and provides a high potential for this tube of a polarity similar to that which may have been placed on 187. It is to be understood that the use of a positive potential to control the right direction of travel may be obviously changed by suitably altering the proper leads.

While I have shown five push-button contacts 201 to simplify the diagram in Fig. 12, it is to be understood that any larger amount may be used and I have actually used 24 push-buttons. Resistances 202 are used to form a voltage dividing system so that any push-button, when depressed, will connect a different potential on taps 205. The commutator segments 49 are connected to the voltage taps 205 through cross-connecting block 204 which permits any segment to be connected to any tap. I prefer to have twice as many segments 49 as push-buttons. In some case it may be advantageous to connect three segments to one tap and the next segment may connect to an individual tap. Other suitable relations may be used. The potential of any push-button contact such as 152 is similar to the potential at 206, when a contact such as 153 is closed as shown. With respect to the operating conditions on tube 187, 188 and 189 this potential may be considered as being zero potential. All contacts on 202 will have either a positive or negative potential with respect to a depressed push-button contact according to whether or not the contacts are to the left or right position with respect to that depressed contact. In Fig. 12 commutator 50 is shown in a rear view similar to Fig. 4, so that when the wiper 48 rotates to the left the disc 24 and its assembly actually rotate to the right. If wiper 48 should be contacting segment 207, with 152 and 153 closed, there will be a negative potential on 207 which will be applied to the grid of tube 187 by going from the wiper 48 to resistance 197 to 208, 210, 215 through contacts on switch 200, 212 and to the grid. This will cause the motor drive to move the wiper towards segment 221. If the wiper was contacting on segment 208 a positive potential from 151 would be similarly applied to the grid of tube 187 to cause the reverse motion to take place until the wiper reached segment 221. On segment 221 motion will be maintained by the locking potential coming from lead 195; provided, however, that the relay 16 is operated and relay contacts 210 and 221 are made and 219 and 209 opened, corresponding to a condition when no radio stations are received. If a radio station is received any place within the range occupied by segment 221, the armatures on relay 16 will be restored, contacts 210 and 221 will break while 219 and 209 will make and control will be transferred to the feeler circuit leading to point 222. When relay 16 is energized the locking circuit is maintained, when the wiper is on segment 221, by the potential drop on resistance 196. When relay 16 is restored resistance 196 is no longer effective and the locking lead potential is shunted by the wiper and contacting segment, while simultaneously control is transferred to the feeler circuit. I prefer to insulate the frame 27 from the radio chassis 54.

If feeler 29 is raised above feeler 30 there is a detuned condition to the left of the resonance point of the station received. Contact point 110 will be closed with 29, but contact point 111 will be opened from 30, causing current to flow through resistance 223, 225 and 226 to point 206. A positive potential, with respect to 206, will develop on 226 which is applied to the grid of tube 187 causing a movement to the right to correct the detuned condition to the left. If feeler 30 is raised above 29 the opposite condition obtains by the action of resistances 224, 225 and 226, causing a negative potential on 222 which is applied similarly to the grid of tube 187 to cause a movement to the left to correct the detuned condition to the right. When the exact center of resonance is reached both feelers make contact and the potential of 222 is zero with respect to 206, allowing the relays 58 and 59 to restore and apply the brake to quickly and accurately stop the motor drive mechanism. Commutator segment 221 corresponds with push-button contacts 152 and 153, however, the same results are obtained on any segment which may be connected to contacts of a depressed push-button.

The elliptical gears 51, 52 and 53, illustrated in Fig. 1, are not required if variable condenser 17 is of the straight line frequency condenser type. Standard circular gears with a one to one speed ratio may be substituted, or other method utilized to couple 17 to shaft 35.

In Fig. 14 character 250 represents the movable member with slot 251. This member moves in a straight line and corresponds to member 24 in the other system described above. The shutters 254 are shown drawn to a larger scale in Fig. 16 and extend substantially in a straight line. The core of the relay 268 holds the pointer 253. The relay 268 is fastened to 250 and moves either to the right or left as 250 is moved by the engagement if gear 255 to teeth 269. Gear 255 is equipped with springs such as 266 to prevent back-lash in the conventional manner. Shaft 267 which drives gear 255, may be coupled with suitable back-lash eliminating gears, to a shaft similar to 35 of Fig. 3. The gear ratio would be such that a half revolution of 35 would cause shaft 267 to rotate gear 255 and move 253 the entire distance occupied by the shutters. Other suitable standard means may be used to move 250.

In the cylindrical form frame 273 corresponds to 27 of Fig. 3. The shutters 274 may be similar to those illustrated in Fig. 16, and curved as in Fig. 17 and Fig. 18. The pointer 275 is held to the core of the relay 276, while the movable slotted member 271, with relay 276 fixed thereon, is rotated by shaft 272, which may be suitably coupled to a shaft similar to 35 of Fig. 3 by known and standard means. In some cases shaft 35 may stand in the vertical position, thus permitting a simplified coupling arrangement to shaft 272, if this is also in the vertical position.

When a push-button is depressed the initial contact voltage is linked to tube 187 through resistance 197. Switch 228 has a left control position 199 and right control position 198 to impress a corresponding positive or negative potential on the grid of tube 187 for independent left and right control. I prefer to have this switch self restoring by spring action in either direction. The locking lead 195 is opened when the switch is operated in either direction.

Switch 200 allows the elimination of the automatic motor drive control, when operated, by opening the grid of tube 187 from the control circuit and holding its potential fixed to that at 206 through resistance 228. Manual control with the knob 88 is then possible. Contacts 229 and 230 provide interstation noise suppression for manual control, by shunting the audio lead 175 to ground, except when stations are received. Lead 240 must then be independently grounded by switch 241.

Lead 211 is connected to spring assemblies 60 and 61 for the complete suppression of the audio circuit when the motor drive is actuated. The operation of switch 200 eliminates the noise suppression feature.

I prefer to construct all shutters, illustrated in Fig. 1, Fig. 16 and Fig. 18, from one piece of thin sheet spring metal with a free end and a fixed end for all shutters, as detailed in Fig. 16, but it is to be understood that each shutter may be constructed as a separate distinct piece and suitably mounted adjacent to each other.

When switch 227 is closed and push-button control is shunted out so that a momentary operation of the switch 228, either to the right or left, will cause the tuning mechanism to suddenly leave a given station and move automatically to a neighboring station, thus obviating the need of the tuning knob 88. When no push-buttons are depressed the wiper 48 may move continuously without stopping. Automatic reversal takes place at the end positions, due to the increasing potential on the segments towards these positions, with a polarity opposite to that of the locking lead 195 which is neutralized and the opposite potential established on the grid of tube 187, and thus causing a reversal in the direction of travel.

The following is a short résumé of the operation of the system:

Referring to both Figs. 12 and 13, the potentials established at 162 and 167 are developed in the known and standard manner. The negative potential at 167, the magnitude of which is proportional to the intensity of the carrier of the received signal, is fed to the grid of tube 177. The return circuit is grounded as shown. A circuit may be traced from source of potential 171 to positive lead 172, through resistance 182, 184, to the plate of tube 177, cathode of this tube to ground, and from ground through a resistance 400 to 219 which terminates back to the negative side of 171. The potential across resistance 184 is directly coupled to tube 179 at 180, 181, with the phase connections being such that a large negative potential at 167 will cut-off the plate current of tube 179 and restore the armature of relay 16. An independent source of plate potential 183 is connected from positive lead to relay coil 20, plate of tube 179, to cathode 180, and back to the negative side of 183, causing current to flow. Armature 21 operates the shutters in accordance with the stations tuned in as scanning takes place.

When the receiver is turned on, all sources of potential will become established and automatic scanning will take place, unless a push-button may be depressed corresponding to a position to which the receiver may be tuned; or if the flip control switch 227 is operated. Assuming the wiper 48 is engaging a segment such as 208 at a positive potential with respect to 206. A circuit may be traced from wiper 48 to 242, through resistance 197 to 222, contact 209 to 210, 215, through contacts on switch 200, back to 212 and to the grid of tube 187. The wiper potential may thus control tube 187. The cathode potential of tube 187 is kept positive with respect to point 206 which furnishes normal grid bias for this tube, at a value sufficient to maintain tubes 188, 189 at normal plate current cut-off. In the instant assumed a positive potential on the wiper is transferred to tube 187, swinging its grid in the positive direction above normal bias.

Tube 187 is directly coupled to both tubes 188, 189. A circuit may be traced from positive of 171 at 172 to 213, through resistance 190, 193, lead 213, to the plate of tube 187, to its cathode, through resistance to 206, ground and resistance 400 to the negative side of 171. The plate of tube 187 is directly connected to the grid of tube 188 and the cathode of tube 189. The cathode of 188 is held at the same potential as 172 for normal plate current cut-off of this tube, while the grid of 189 is maintained at a comparatively negative potential, also for normal plate current cut-off.

In the instance mentioned, when the grid of 187 swings in the positive direction, the potential at 193 will be lowered, due to the increased current flowing through resistance 190. This causes the cathode of 189 to swing negatively, thereby its grid will swing relatively in the positive direction, causing current to flow in the plate circuit of this tube. A circuit may be traced from the positive side of potential source 192 through coil 83, the plate of 189, cathode, and back to the negative side of 192. The current flowing in this circuit will cause relay 59 to operate closing all the contacts 60. This causes motor 36 to turn the tuning mechanism in the right direction. Independent alternating currents from source 194 may be traced through operated contacts of 60 in the conventional manner to motor 36. Wiper 48 will leave segment 208 and move towards segments 221, 207.

When contacts 60 close, a circuit may be traced from positive lead 172, 218, through a limiting resistor, to closed contacts of 60, to locking lead 195, through the make before break contacts on switches 199, 198, to lead 214, and to contact 221. At the positions where no stations are received by the receiver, relay 16 is energized and closes contacts 221, 210. The locking lead is then traced to 210 from which the circuit has already been traced to the grid of tube 187. Where stations are received, relay 16 is not energized and the locking lead at 214 may be traced through resistance 196, to wiper 48 and an engaged segment, to resistance 202, to the negative side of 171, if the locking lead has a positive potential. The wiper will then have a positive locking potential due to the potential drop across that portion of 202 between a push-button depressed contact and a wiper engaged segment. This voltage is transferred to the grid of tube 187 through lead 242 already traced.

A small initial potential linked to control 187 will cause an operation of relay 58 or 59, causing a locking voltage to be placed back on the grid of 187 to reinforce the original potential. As the wiper travels, the segments which are contacted have an increasingly negative potential, in the instance mentioned, and at the last segment the locking potential on the wiper is overcome and additional potential of opposite polarity is provided. This new potential is transferred to the grid of tube 187, causing a raising of the positive potential at 193, due to the decreased current through resistance 190. This causes the grid of tube 188 to swing in the positive direction with respect to its cathode. A current will flow from the source 191, which may be traced from positive at 191, through coil 84, to the plate of tube 188, to the cathode, and to the negative side of 191.

Relay 59 will then operate to move the motor 36 in the left direction. The connections of 61 are similar to those of 60, except for the standard reversal of the shading pole leads as shown. A circuit may be traced from the negative lead 219 through limiting resistor, to closed contacts of 61, to locking lead 195. From this point the operation is similar to that caused by a positive potential, except for the reversal of polarity and direction.

Continuous scanning with automatic reversal takes place as explained above. The stations on the air will then give the shutter indication. If a push-button is depressed such as 153, the potential at 206 is transferred by 153, 152 to segment 221. When the wiper 48 arrives at this segment the locking potential at 242 is shunted out insofar as its effect on tube 187 is concerned. The locking potential will be still effective on tube 187 to maintain motion, however, so long as relay 16 is energized corresponding to positions in the tuning range where no stations are received. The locking potential at 214 is then transferred from 221 to 210, 215 and thence to the grid of tube 187, as previously traced. The locking potential drop across 195 is then utilized.

Motion will be maintained on segment 221, even though push-button 153 is depressed, if no stations are received. If a station is received in any position of segment 221, relay 16 restores, opening contacts 221, 210 and removing the locking potential from tube 187 and transferring control to the feeler circuit from 210 to 209 to 222. As detailed previously a positive potential is placed on 222 when there is a detuned condition to the left and a negative potential is applied when there is a detuned condition to the right. This potential is placed on the grid of tube 187 to cause the required correcting movements. When the resonance point is reached the brake 68 is released to stop the tuning mechanism. The potential at 222 is then similar to that at 206, since lead 206 may be traced to 24 to both 29, 30, to 110, 111, 226, 225 and 222. This holds 187 at normal bias with 188, 189 at cut-off and relays 58, 59 normal.

If push-button 154 is depressed, 153 will release, and contact 152 will have a negative potential with respect to 151 which becomes reference point at a potential similar to 206. This negative potential at 152 is then transferred to the grid of tube 187, as explained previously, causing a homing movement by the shortest route of the wiper towards the segment on the commutator connected to 151.

If switch 227 is closed to 203 the entire push-button and commutator unit is shunted out and rendered as if all push-buttons were depressed. If the flip control switch 198 is then operated, a positive potential is linked from 218 to 212 causing movement in the right direction. The locking lead 195 may connect directly to 214 eliminating connections on switches 198, 199, if the limiting resistors are held at a close value to prevent neutralizing of potentials if the opposite polarity is operative when the flip switch is operated. Switch 199 causes the opposite movement when operated. Both switches are self restoring permitting the locking lead to maintain motion in whatever direction the motion may have been started by the momentary flip. Such motion continues until a station is reached at which position the feeler circuit will accurately control the stopping.

During the time of travel, while the mechanism may move from one station to another, actual scanning is taking place to correct the shutter indications if necessary. Should there be variations in the constants of the radio receiver, to cause changes in the positions of the stations, the new positions will thereafter control the stopping of the tuning system. The same conditions apply in any wave band to which the receiver may be receptive.

Various changes may be made by those skilled in the art in details of construction of my invention without departing from the spirit thereof as set forth in the drawings, specifications and claims.

I claim:

1. A signal tuning control comprising in combination, a receiver having a tuner, a series of shutters adapted to be moved, a movable member coupled to the tuner and having a relay adapted to be operated, an armature on the relay having a finger adapted to move the shutters, means for utilizing the receiver to operate the relay in accordance with the signals received, a motor drive adapted to move to the left and right directions and coupled to the tuner to operate the same, a locking lead with means cooperating therewith to maintain motion of the motor drive when the relay armature is positioned corresponding to a detuned condition of the receiver, and contacts on the relay to disengage the locking lead when the armature is operated in accordance with a tuned in signal with means engaging the moved shutters to stop the motor drive on the tuned in signal.

2. A radio tuning control comprising in combination, a radio receiver having variable tuning means, a motor to drive said means, a series of shutters, a member coupled to said means and movable relative to the said shutters, and adapted to operate them in response to the tuning-in of a signal, and means controlled by operated shutters to stop said motor.

3. A radio tuning control as claimed in the preceding claim with the last mentioned means including a centering switch adapted to stop the motor on substantially the center of a group of operated shutters, corresponding to the position of resonance of the said variable tuning means with a tuned-in signal.

4. A radio tuning control comprising in combination, a radio receiver having variable tuning means, a series of shutters, a member coupled to the said tuning means and movable relative to the shutters and having a relay adapted to operate them in response to the tuning-in of a signal, a manually operated switch with means adapting the same to start the motor in either the right or left directions, locking means to maintain the motor driving when the said switch is restored, and means controlled by operated shutters to stop said motor.

5. A signal tuning control and indicator comprising in combination, a signal receiver having variable tuning means, a motor to drive said means, a series of shutters, a member coupled to said means and movable relative to the shutters, and adapted to operate them in response to the tuning-in of a signal to give a visible indication, and means controlled by operated shutters to stop said motor.

6. A radio tuning control comprising in combination, a radio receiver having variable tuning means, a motor drive to drive said means, a right relay to control the motor in the right direction, a left relay to control the motor in the left direction, a brake with a force acting normally on the motor drive to stop the same, an armature on each relay linked to the brake and adapted to operate the same independently, and means responsive to a tuned-in signal controlling the release of the brake to stop the motor drive.

7. A radio tuning control comprising in combination, a radio receiver having a tuner, a series of shutters each having a normal and an operated position, means for operating the shutters when the tuner is receiving signals, a centering switch to center on the operated shutters and having means cooperating therewith to give a potential when off center to the right of opposite relative polarity to the potential when off center to the left, a motor drive coupled to the tuner adapted to start and stop and have a direction of travel dependent upon the potential given by the said centering switch whereby the motor drive moves by the shortest route to the center of the operated shutters corresponding to resonance of a radio station received.

8. A radio tuning control comprising in combination, two feeler members adapted to be moved independently, a movable member having contact points adapted to be moved in unison and engage the feeler member, means for disengaging one feeler member from its contact point by the movement of the other feeler member, bridging resistors connected to the contact points and having a common feeler lead and potential resistors also connected to the contact points whereby said feeler lead will have a relative polarity with respect to the feeler members similar to the polarity of the potential resistor connected to a disengaged contact point.

9. A radio station tuning control comprising in combination, a radio receiver having a tuner, a series of shutters adapted to be moved, a movable member coupled to the tuner and having a relay adapted to be operated, an armature on the relay having a finger adapted to move the shutters when the relay is operated, means for holding the moved shutters, means for utilising the receiver to operate the relay in accordance with the radio stations received, a motor drive adapted to move to the left and right directions and coupled to the tuner to operate the same throughout its entire range, a centering switch engaging the held shutters and having means cooperating therewith to stop the motor drive, a commutator with a series of segments having means cooperating therewith to control the direction of travel of the motor drive, a wiper adapted to engage the segments and coupled to the tuner, a series of push buttons each adapted to connect a segment, a locking lead with means to maintain motion of the motor drive when the wiper engages a push button connected segment, contacts on the relay adapted to disengage control of the locking lead and to transfer control of the motor drive to the centering switch when the relay is operated.

10. An electrical control comprising in combination, a signal receiver having a tuner, a motor drive coupled to the tuner, a right relay adapted to control the motor drive to the right when energized, a left relay adapted to control the motor drive to the left when energized, a right amplifying tube to control the right relay, a left amplifying tube to control the left relay, a series of resistors arranged for tapped potential division, a series of contacts each adapted to connect a tap on the said potential dividing resistors, a commutator having a series of segments connected to the said potential taps, a wiper to engage the segments coupled to the tuner and giving a potential corresponding to an engaging segment and of a polarity dependent upon the relative direction of the push button connected segment, a control lead common to both right and left amplifying tubes having means adapting the same to provide control potential for the tubes, and means for applying a potential by the wiper to the control lead whereby the right tube is excited to energize the right relay by a potential of polarity opposite to that required for the left relay.

ARNOLD LESTI.